United States Patent
Soejima et al.

(10) Patent No.: US 8,515,652 B2
(45) Date of Patent: Aug. 20, 2013

(54) CONTROL DEVICE FOR INTERNAL COMBUSTION ENGINE

(75) Inventors: Shinichi Soejima, Gotenba (JP); Naoto Kato, Susono (JP); Kaoru Otsuka, Mishima (JP); Kiyonori Takahashi, Susono (JP); Hiroyuki Tanaka, Susono (JP); Ryutaro Moriguchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 13/146,828

(22) PCT Filed: Mar. 24, 2009

(86) PCT No.: PCT/JP2009/055763
§ 371 (c)(1),
(2), (4) Date: Jul. 28, 2011

(87) PCT Pub. No.: WO2010/109589
PCT Pub. Date: Sep. 30, 2010

(65) Prior Publication Data
US 2012/0022770 A1    Jan. 26, 2012

(51) Int. Cl.
F02M 51/00    (2006.01)
F02D 17/04    (2006.01)

(52) U.S. Cl.
USPC .......................................... 701/112; 123/493

(58) Field of Classification Search
USPC .................. 701/104, 110, 111, 112; 123/493, 123/329, 332, 325, 319, 320, 406.47, 198 DB
See application file for complete search history.

(56) References Cited

U.S. PATENT DOCUMENTS

| | | | | |
|---|---|---|---|---|
| 4,391,243 A | * | 7/1983 | Bessho | 123/325 |
| 2004/0250792 A1 | * | 12/2004 | Mizobuchi et al. | 123/322 |

FOREIGN PATENT DOCUMENTS

| | | |
|---|---|---|
| JP | A-8-150858 | 6/1996 |
| JP | A-10-37777 | 2/1998 |
| JP | A-2001-271690 | 10/2001 |
| JP | A-2004-156449 | 6/2004 |
| JP | A-2004-251171 | 9/2004 |
| JP | A-2006-328984 | 12/2006 |
| JP | A-2007-113507 | 5/2007 |
| JP | A-2008-128082 | 6/2008 |

OTHER PUBLICATIONS

International Search Report dated Jun. 2, 2009 in International Application No. PCT/3P2009/055763 (with translation).

* cited by examiner

*Primary Examiner* — Mahmoud Gimie
(74) *Attorney, Agent, or Firm* — Oliff & Berridge, PLC

(57) ABSTRACT

A control device for an internal combustion engine is provided. The control device includes means which controls fuel injection by a fuel injection device, and means which controls the throttle. The fuel injection control means sequentially restarts fuel injection for each cylinder in accordance with an ignition sequence among cylinders when cancellation conditions of fuel cut are satisfied during implementation of the fuel cut. Meanwhile, the throttle control means firstly controls the throttle to a closing side when the cancellation conditions of fuel cut are satisfied. The throttle is controlled to the closing side, whereby the air amount in the intake pipe is decreased, and the air amount in a cylinder which is the basis of calculation of a fuel injection amount is also decreased.

6 Claims, 3 Drawing Sheets

CONTROL DEVICE FOR INTERNAL COMBUSTION ENGINE

TECHNICAL FIELD

The present invention relates to a control device for an internal combustion engine which is used as a power unit of a vehicle, and more particularly to a control device for an internal combustion engine in which a throttle can be operated during implementation of fuel cut.

BACKGROUND ART

Conventionally, at the time of deceleration of a vehicle, fuel cut for stopping fuel supply to an internal combustion engine has been performed. By performing fuel cut, useless fuel consumption can be restrained. Meanwhile, however, there are various problems concerning fuel cut. For example, there is the problem of how to restrain the torque shock which occurs at the time of execution of fuel cut, and torque shock which occurs at the time of return from fuel cut. Furthermore, control of deceleration of a vehicle when fuel cut is carried out is one of the problems.

In order to solve these problems, various inventions have already been made. For example, Japanese Patent Laid-Open No. 2001-271690 discloses the invention which has an object to solve the problem of restraining the torque shock which occurs at the time of execution of fuel cut. According to the invention, the ignition time is delayed prior to fuel cut, and thereby, the output torque of the internal combustion engine directly before the fuel cut is reduced. Further, Japanese Patent Laid-Open No. 2006-328984 discloses the invention for restraining the torque shock which occurs at the time of return from fuel cut. The invention intends to prohibit the throttle opening from being controlled to the opening corresponding to a requested acceleration degree while the inner pressure of an intake pipe is larger than target intake pipe inner pressure at the time of cancellation of fuel cut. According to the invention disclosed in Japanese Patent Laid-Open No. 2004-251171, operation of a throttle is performed in accordance withthe target throttle opening which is set based on the target torque so that an optimal engine braking force can be obtained while fuel cut is implemented.

Here, the problem of the invention disclosed in Japanese Patent Laid-Open No. 2004-251171 will be discussed. In the invention, control of torque (minus torque to be a braking force) is performed by using pumping loss, and therefore, even during implementation of fuel cut, the throttle is not always fully closed. Therefore, it can happen that the throttle is open at the time point when the fuel cut is cancelled. As for cancellation of fuel cut, fuel cut is suddenly cancelled by the operation of an accelerator pedal of a driver and the intervention of the control system of a vehicle. When fuel cut is cancelled in the state in which the throttle is open, combustion is restarted from the state in which much air is in an intake pipe, and therefore, unintentional excessive torque is suddenly outputted. More specifically, the invention disclosed in Japanese Patent Laid-Open No. 2004-251171 has the problem of the possibility of occurrence of a torque shock accompanying return from fuel cut.

As the solution of this problem, for example, application of the invention disclosed in Japanese Patent Laid-Open No. 2006-328984 is conceivable. However, the invention is effective in the one in which the throttle is closed during implementation of fuel cut, but does not always obtain a sufficient effect in the one in which the throttle is operated during implementation of fuel cut. This is because the throttle is sometimes open at the time point when the fuel cut is cancelled in the latter, and in such a case, the inner pressure in the intake pipe never decreases sufficiently how long one may wait. Accordingly, the invention disclosed in Japanese Patent Laid-Open No. 2006-328984 cannot be used as the solution to the problem which belongs to the invention disclosed in Japanese Patent Laid-Open No. 2004-251171.

SUMMARY OF INVENTION

The present invention is made to solve the problem as described above, and has an object to provide a control device for an internal combustion engine which can prevent occurrence of a torque shock accompanying cancellation of fuel cut in the internal combustion engine in which a throttle can be operated during implementation of the fuel cut.

A control device according to the present invention is a control device for use in an internal combustion engine in which a throttle can be operated during implementation of fuel cut. The control device according to the present invention includes means which controls fuel injection by a fuel injection device, and means which controls the throttle. The fuel injection control means sequentially restarts fuel injection for each cylinder in accordance with an ignition sequence among cylinders when cancellation conditions of fuel cut are satisfied during implementation of the fuel cut. Meanwhile, the throttle control means firstly controls the throttle to a closing side when the cancellation conditions of fuel cut are satisfied. In concrete, the throttle may be closed to a predetermined opening (for example, full closure) at a maximum speed, or the throttle may be gradually closed at a predetermined speed. The throttle is controlled to the closing side, whereby the air amount in the intake pipe is decreased, and the air amount in a cylinder which is the basis of calculation of a fuel injection amount is also decreased. The throttle control means executes the operation until the air amount in a cylinder is determined in the first cylinder in which fuel injection is restarted. Thereby, the torque which is generated by the first combustion after return from the fuel cut can be suppressed to be low. Next, the throttle control means controls the throttle to an opening side in accordance with the target air amount in a cylinder determined from a required torque after combustion is performed once or a plurality of times. Thereby, the air amount in a cylinder can be increased to achieve the required torque from the torque directly after the restart of combustion which is suppressed to be low.

In another preferable mode of the present invention, the throttle control means controls an opening of the throttle to generate pump loss corresponding to a required torque during implementation of fuel cut. The torque (illustrated torque) of the internal combustion engine at the time of implementation of fuel cut is determined by pump loss, and therefore, if the pump loss is regulated by the opening of the throttle, the deceleration of the vehicle can be controlled.

In another preferable mode of the present invention, the control device according to the present invention includes means which sets a target opening of the throttle based on a target air amount in a cylinder determined from a required torque, when the cancellation conditions of fuel cut are satisfied, and means which delays the set target opening by a predetermined delay time. In this mode, the throttle control means controls the throttle to a closing side until the delay time elapses after the cancellation conditions of fuel cut are satisfied, and controls the throttle in accordance with the target opening subjected to delay processing after the delay time elapses. More specifically, the air amount in the intake pipe is decreased by using the delay time which occurs in the delay control of the throttle, so that the torque which is generated by the combustion during this while is suppressed to be low.

In another preferable mode of the present invention, the throttle control means controls the throttle to a closing side when the air amount in a cylinder predicted at a time point when the cancellation conditions of fuel cut are satisfied exceeds a predetermined reference amount. Meanwhile, when the predicted air amount in a cylinder is not larger than the predetermined reference amount, the throttle control means keeps the throttle at a constant opening until the delay time which takes for delay control of the throttle elapses. When the predicted air amount in a cylinder is small, the torque which is generated by combustion is low, and the possibility of occurrence of torque shock is low. In such a case, useless movement of the throttle can be suppressed by keeping the throttle at a constant opening without operating the throttle.

In another preferable mode of the present invention, the control device according to the present invention further includes means which controls an ignition time in accordance with a deviation of torque in order to compensate the deviation of the torque by torque regulation by an ignition time when a required torque is lower than a torque which is achieved by the throttle being controlled in accordance with a target opening. In this mode, the throttle control means closes the throttle in accordance with a target air amount in a cylinder determined from the required torque until the implementation conditions of fuel cut are satisfied during deceleration of a vehicle. After the throttle is closed to its minimum opening, the ignition time control automatically works, and delay of the ignition time is performed to compensate the difference between the torque which is achieved by the minimum opening of the throttle and the required torque. When the implementation conditions of fuel cut are satisfied, the throttle control means opens the throttle temporarily to a maximum opening, and thereafter, closes the throttle again to increase pump loss in accordance with decrease of the required torque. Thereby, the torque level difference before and after fuel cut is decreased, and continuity of torque can be kept.

In another preferable mode of the present invention, the throttle control means opens the throttle to the maximum opening prior to cancellation of fuel cut when the cancellation conditions of the fuel cut are satisfied during implementation of the fuel cut. Thereby, pump loss can be decreased in accordance with increase in the required torque, and the torque directly before return from the fuel cut can be made close to the minimum torque in the combusting state. After the fuel cut is cancelled, the throttle is controlled in accordance with the target air amount in a cylinder which is determined from the required torque. In this case, if delay of the ignition time is automatically performed to compensate the deviation of the torque due to the actual air amount in a cylinder after cancellation of the fuel cut and the target air mount in a cylinder, the torque level difference between before and after return from the fuel cut is decreased, and continuity of the torque can be kept.

In another preferable mode of the present invention, the throttle control means keeps the throttle at a constant opening without opening the throttle or closes the throttle to full closure when the implementation conditions of fuel cut are satisfied if operation of a brake actuator is sensed during deceleration of the vehicle. If the brake actuator is operated, the deceleration of the vehicle is realized by the braking force. In such a case, useless movement of the throttle can be eliminated by keeping the throttle at a constant opening without opening the throttle, or closing the throttle to full closure.

DESCRIPTION OF EMBODIMENT

An embodiment of the present invention will be described with reference to each of FIGS. 1 to 6.

A control device of the present embodiment is applied to a spark ignition type four stroke internal combustion engine, and controls an operation of the internal combustion engine by operating actuators, that is, a throttle, an ignition device and a fuel supply device. First, the outline of the control device of the present embodiment will be described with reference to FIG. 1.

Figure 1:
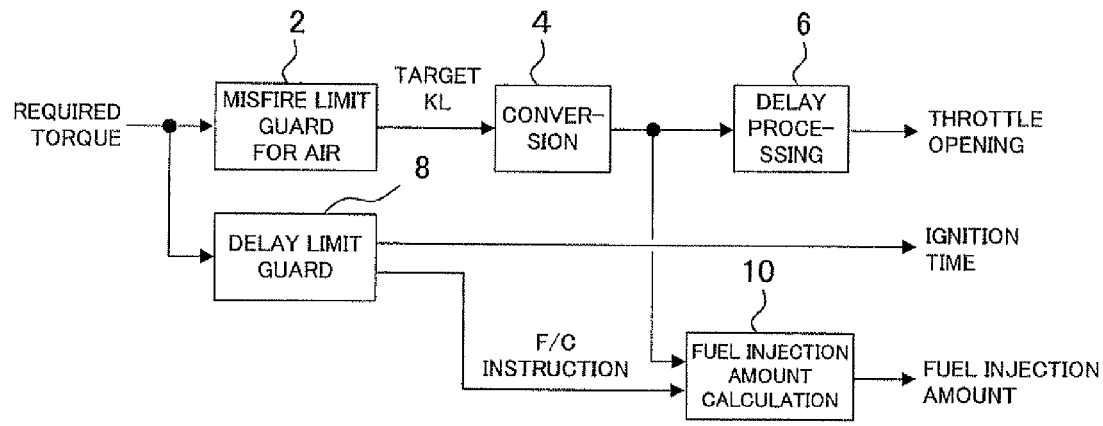
FIG. 1 is a functional block diagram showing a function of a control device for an internal combustion engine as an embodiment of the present invention.

FIG. 1 is a functional block diagram showing a function of the control device of the present embodiment. The control device is configured by a CPU, a memory, an input and an output circuits and the like, and the various functions are realized by reading programs from the memory and causing the CPU to execute the programs. The memory of the control device stores a plurality of programs (routines) in accordance with the operations of the internal combustion engine desired to be realized. In accordance with the content of the program which is executed, that is, in accordance with the operation of the internal combustion engine which is desired to be realized, the content of the functional block diagram differs. The functional block diagram of FIG. 1 shows the function corresponding to the operation of the internal combustion engine until the fuel cut is implemented, which is realized by the present embodiment.

The functional block diagram of FIG. 1 shows five functions for realizing the operations of the internal combustion engine until fuel cut is implemented. Of them, respective blocks designated by reference signs 2, 4 and 6 in FIG. 1 correspond to the functions for controlling the throttle opening. In more detail, the block designated by reference sign 2 corresponds to the function for calculating a target KL from a required torque. The required torque is the required value of torque required to the internal combustion engine from a vehicle, and is supplied to the present control device from a control device of the entire vehicle which is at the higher order than the present control device. The higher-order control device determines a required torque by considering a torque for responding to the operation amount and the operation speed of the accelerator pedal by a driver, a torque required for attitude control or the like of the vehicle, a torque required for driving accessories and the like totally. KL means an air amount in a cylinder or the charging efficiency or a load rate which is obtained by making the air amount in a cylinder dimensionless. A target KL is a target value of KL which is required for realizing a required torque under the preconditions that the ignition time is MBT, and the air-fuel ratio is controlled to be the target air-fuel ratio. For calculation of the target KL, the map with the required torque and the target KL related to each other is used. According to the map, the target KL is reduced in accordance with reduction in the required torque. However, the block 2 is provided with the guard function for preventing a misfire due to excessive reduction in KL. The guard function works when the target KL reduces to a misfire limit value, and even if the required torque further is reduced, the calculation value of the target KL is kept at the misfire limit value.

The target KL calculated in the block 2 is converted into a throttle opening in the block designated by reference sign 6. For conversion, the inverse model of an air model is used. The air model is the physical model of an intake system, and is the result of modeling the response of KL to the operation of a throttle based on fluid dynamics. The throttle opening which is obtained by converting the target KL becomes the target opening of the throttle. However, the target opening is not directly outputted to the throttle, but is outputted after being subjected to delay processing in the block designated by reference sign 6, that is, by being delayed by a predetermined delay time Td with respect to input.

A block designated by reference sign 8 in FIG. 1 corresponds to the function for controlling an ignition time. In block 8, the torque (hereinafter, an estimated MBT torque), which is achieved by the throttle being controlled in accordance with the target opening when the ignition time is MBT, is calculated. When the estimated MBT torque exceeds the required torque, a delay amount of the ignition time is calculated in accordance with the magnitude of the deviation of the torque in order to compensate the deviation of the torque by torque regulation by the ignition time. However, the block 8 is provided with the guard function for preventing a misfire due to excessive delay of the ignition time. The guard function works when the delay amount increases to a misfire limit value, and even if the deviation of the aforementioned torque is further enlarged, the delay amount of the ignition time is kept at the misfire limit value. Further, when the guard function works, an F/C instruction signal for giving an instruction to stop fuel supply (fuel cut) is outputted, and ignition of the cylinder in which fuel injection is stopped is stopped.

A block designated by reference sign 10 in FIG. 1 corresponds to the function for controlling a fuel injection amount. In block 10, a fuel injection amount required for realizing a target air fuel ratio is calculated for each cylinder based on a throttle opening which is inputted from the block 4. More specifically, when a calculation timing of the fuel injection amount comes in a certain cylinder, the throttle opening at the time ahead by the time until the valve opening time point of the intake valve from the calculation timing is predicted. The throttle opening which is inputted from the block 4 corresponds to the prediction value of the throttle opening at the time ahead by a delay time Td from the present. Accordingly, by watching the input history of the throttle opening from the block 4, the throttle opening at the valve closing time point of the intake valve of each of the cylinders can be predicted. If the throttle opening at the valve closing time point of the intake valve of each of the cylinders can be predicted, KL of each of the cylinders which is the basis of calculation of the fuel injection amount can be predicted. This is because KL is determined at the closing time point of the intake valve (the prediction value of KL at the closing time point of the intake valve is also called a pre-read air amount). In the block 10, the fuel injection amount is calculated at each of the cylinders from the determined value of KL of each of the cylinders and the target air-fuel ratio. In the present embodiment, the target air-fuel ratio may be fixed, or may be supplied as a required value from the higher-order control device similarly to a required torque. The aforementioned F/C instruction signal is inputted in the block 10. The block 10 is provided with the function of stopping the fuel injection after the F/C instruction signal is inputted.

Figure 2:
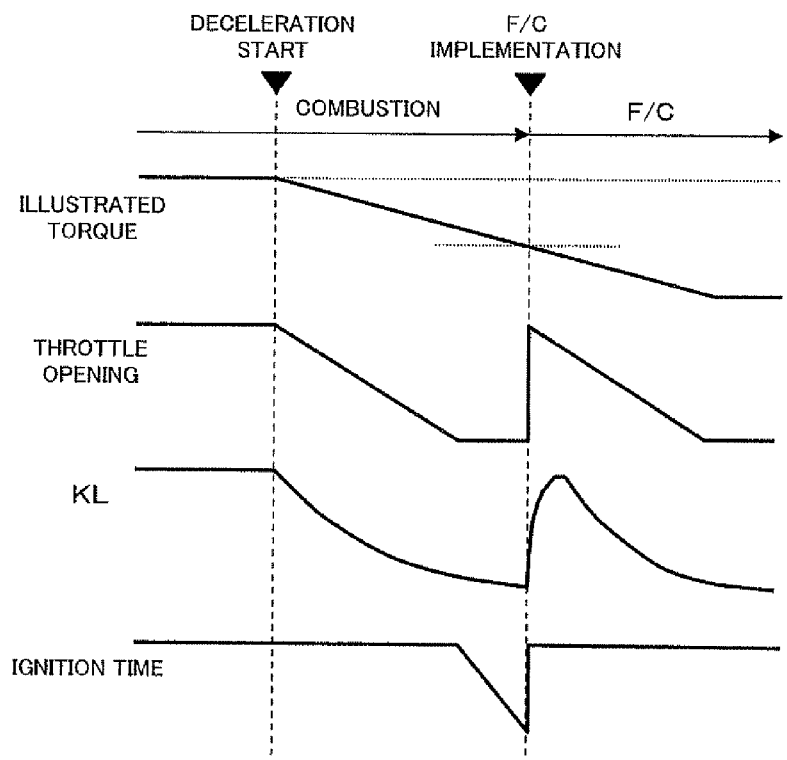
FIG. 2 is a diagram for explaining an operation of the internal combustion engine before and after fuel cut which is realized according to the embodiment of the present invention.

According to the functions shown in the functional block of FIG. 1, the operation of the internal combustion engine shown by the graph in FIG. 2 can be realized. The graph of FIG. 2 shows each of the temporal changes of the illustrated torque, throttle opening, KL and ignition time from the start of deceleration of the vehicle in a certain timing by associating the time base each of the temporal changes. When deceleration of the vehicle is started, the required torque is decreased from that timing, and the throttle is closed to realize the deceleration. KL is decreased by the throttle being closed, and the illustrated torque of the internal combustion engine decreases. When the target KL decreases to the misfire limit after a while, control to the closing side of the throttle is stopped so as not to reduce KL any more. After the throttle opening is closed to the limit, the ignition time is delayed corresponding to further reduction in the required torque, and fuel cut is implemented at the time point when the ignition time is delayed to the misfire limit.

Such an operation is realized, whereby the torque of the internal combustion engine can be continuously reduced to the minimum torque in the combustion state. The torque shock which occurs due to fuel cut is determined by a torque difference immediately before and immediately after the fuel cut, and therefore, the torque shock can be restrained by reducing the torque immediately before the fuel cut to the minimum torque.

The operation until the fuel cut is implemented is described above. Further, the present embodiment has the feature in the operation of the internal combustion engine which is realized after the fuel cut is implemented. In order to restrain the torque shock accompanying the fuel cut more, the torque directly after the fuel cut is made as close as possible to the torque directly before the fuel cut. FIG. 2 shows the operation of the internal combustion engine for this, in more detail, the control method of the throttle.

According to the operation shown in FIG. 2, the control device of the present embodiment opens the throttle to the maximum opening (or full opening) at the maximum speed with implementation the fuel cut (F/C). This is because the pump loss of the internal combustion engine can be minimized by opening the throttle to the maximum opening. The temporal change of KL shown in FIG. 2 corresponds to the temporal change of the pump loss. The timing at which the throttle is moved to the maximum opening is preferably after the intake valve is closed in the final combustion cylinder before fuel cut. Further, the timing is more preferably the timing at which the throttle has the maximum opening before the intake valve is opened in the initial intake stroke cylinder after the fuel cut. The illustrated torque of the internal combustion engine in a non-combusting state is determined by the pump loss, and therefore, if the pump loss of the internal combustion engine is minimized by opening the throttle to the maximum opening, the torque directly after the fuel cut can be made the closest to the torque directly before the fuel cut.

After opening the throttle to the maximum opening, the control device closes the throttle again. By closing the throttle, the pump loss of the internal combustion engine is increased and the illustrated torque is decreased. The torque obtained when the throttle is closed to full closure is the minimum torque in the non-combusting state. The control device implements such a closing operation of the throttle at the speed corresponding to the decreasing speed of the required torque. Thereby, not only the torque level difference before and after the fuel cut can be kept at a minimum, but also continuity of the torque during implementation of the fuel cut can be kept.

The control of the throttle as above can be realized by switching the map with the required torque and the target KL related to each other to the one for the non-combusting state from the one for the combusting state. The inverse model of the air model for converting the target KL into the throttle opening for the combusting state can be also used directly. The delay processing of the throttle opening is not always needed after implementation of the fuel cut. The delay processing of the throttle opening is the processing for the purpose of accurately calculating KL which is the basis of calculation of the fuel injection amount.

Alternatively, after implementation of the fuel cut, the throttle opening may be determined directly from the required torque without using the aforementioned map and inverse model of an air model. Alternatively, the operation of temporarily opening the throttle to the maximum opening, and thereafter, closing the throttle again may be automatically performed with implementation of fuel cut as the trigger.

However, the above described operation of the throttle is prohibited when the operation of the brake actuator is sensed during deceleration of the vehicle. In such a case, even when fuel cut is implemented, the throttle is not opened, and is kept at the opening directly before the fuel cut is implemented. Alternatively, the throttle may be closed to full closure. This is because if the brake actuator is operated, the deceleration of the vehicle is realized by a stronger braking force, and therefore, the deceleration does not have to be controlled by the torque (engine brake force) of the internal combustion engine. In such a case, the throttle is not opened and is kept at a constant opening, or is closed to full closure, whereby useless movement of the throttle can be eliminated.

Figure 3:
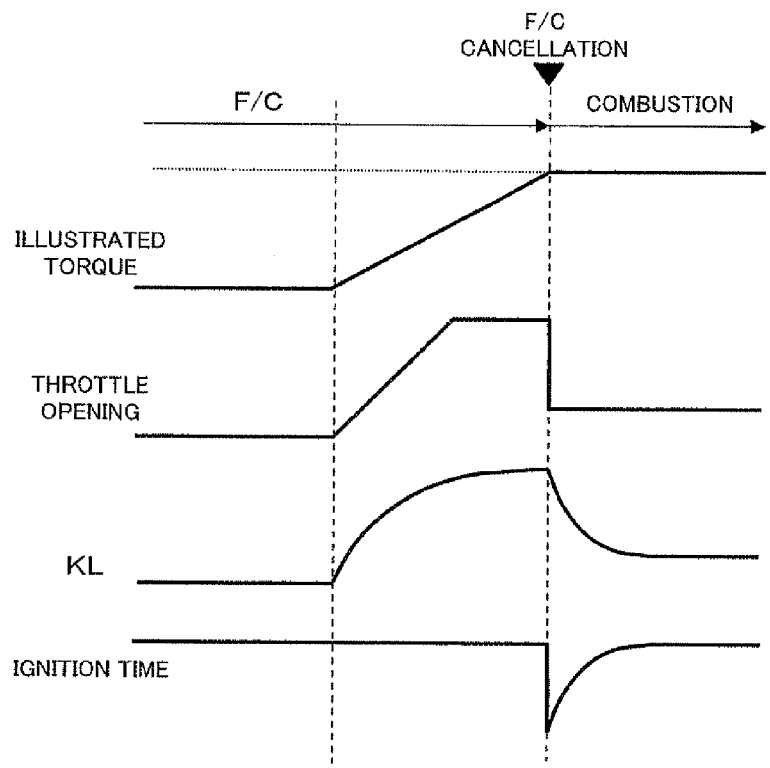
FIG. 3 is a diagram for explaining an operation of the internal combustion engine before and after return from the fuel cut which is realized according to the embodiment of the present invention.

Next, the operation of the internal combustion engine before and after return from the fuel cut which is realized by the present embodiment will be described. The graph of FIG. 3 shows each of the temporal changes of the illustrated torque, the throttle opening, KL and the ignition time after the cancellation conditions of the fuel cut is satisfied in a certain timing by causing each of the temporal changes to correspond to the time base. The cancellation conditions of the fuel cut are, for example, reduction of the engine speed of the internal combustion engine to a predetermined limit speed, operation of the accelerator pedal by a driver and the like.

The control device of the present embodiment gradually opens the throttle to the maximum opening prior to cancellation of fuel cut when the cancellation conditions of the fuel cut are satisfied. By opening the throttle, the pump loss of the internal combustion engine is being decreased, and the illustrated torque is increasing. The torque obtained when the throttle is opened to the maximum opening (or full opening) is the maximum torque in the non-combusting state. Cancellation of the fuel cut is performed at the point of time when the illustrated torque increases to the maximum torque in the non-combusting state. The timing at which the fuel cut is cancelled may be a time point when the estimated value of the KL which is calculated from the throttle opening increases to a predetermined value, or may be a time point at which a predetermined time elapses after the cancellation conditions of the fuel cut are satisfied.

The target opening of the throttle after return from the fuel cut is calculated from the target KL for realizing the required torque. According to the operation shown in FIG. 3, with cancellation of fuel cut, the throttle is closed to the target opening at the maximum speed. However, the response of KL to the operation of the throttle is delayed, and therefore, the actual KL does not immediately lower to the target KL. Therefore, if the ignition time is set at MBT, the torque which is actually outputted from the internal combustion engine exceeds the required torque.

According to the function of the control device of the present embodiment, torque regulation is performed by delay of the ignition time in such a case. The function for controlling the ignition time is as described by using the functional block diagram of FIG. 1. Delay of the ignition time automatically works, and thereby, excessive torque is prevented from being generated directly after return from the fuel cut even though the throttle is opened to the maximum opening until the time directly before return from the fuel cut. Thereby, the torque level difference before and after return from fuel cut is kept at a minimum, and continuity of torque can be kept.

The operation of the internal combustion engine before and after return from the fuel cut described above is the operation in the case of the throttle returning from the state in which the throttle is fully closed. However, as described by using FIG. 2, according to the control device of the present embodiment, in order to keep continuity of the torque, the throttle is temporarily opened to the maximum opening when fuel cut is implemented, and thereafter, the throttle is closed to full closure again. Therefore, cancellation of fuel cut may be required suddenly in the state in which the throttle is opened to a large degree in some cases. For example, such cases include the case where the accelerator pedal operation is performed by a driver, the case where some control works on the vehicle side and the required torque which is supplied from the higher-order control device increases, and the like. In such cases, the inside of the cylinder is in the state in which a large amount of air is included, as is known from the temporal change of KL of FIG. 2, and when fuel cut is cancelled in this state, a large torque corresponding to KL is generated since the fuel injection amount is calculated based on KL. Namely, large torque shock is likely to occur with return from fuel cut. Thus, in such a case, control of the internal combustion engine by the control device is performed so as to realize the operation as described as follows.

Figure 4:
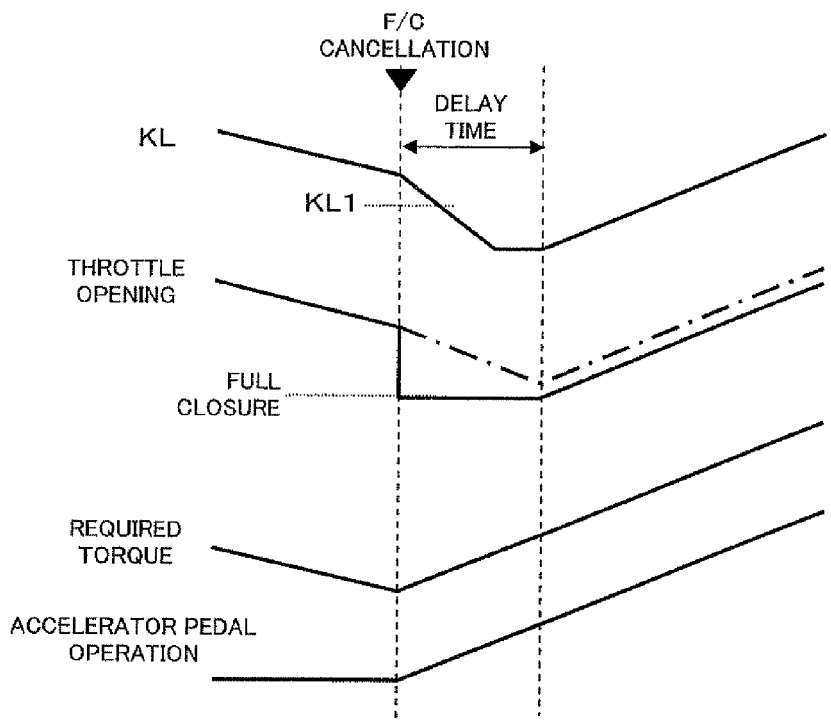
FIG. 4 is a diagram for explaining a detailed operation of the internal combustion engine in the case of fuel cut being cancelled halfway in a closing operation of a throttle which is realized according to the embodiment of the present invention.
Figure 5:
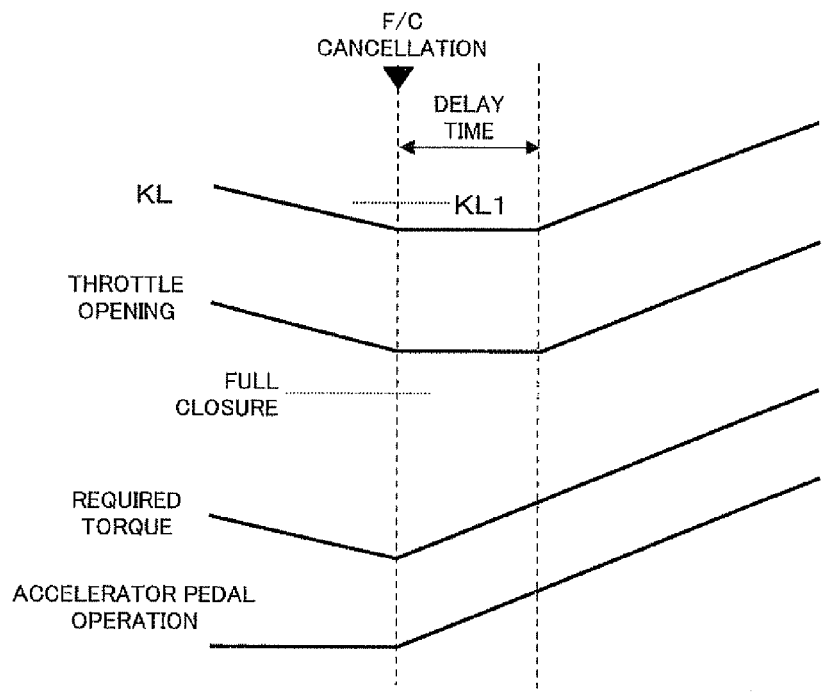
FIG. 5 is a diagram for explaining a detailed operation of the internal combustion engine in the case of fuel cut being cancelled halfway in the closing operation of the throttle which is realized according to the embodiment of the present invention.

FIGS. 4 and 5 are drawings for explaining the detailed operation of the internal combustion engine which is realized by the present embodiment, in more detail, the detailed operation of the internal combustion engine when fuel cut is cancelled halfway in the closing operation of the throttle. Each of the graphs of FIGS. 4 and 5 shows each of the temporal changes of KL, the throttle opening, the required torque and the accelerator pedal operation by causing each of the temporal changes to correspond to the time base. Each of the graphs shows the case where the required torque increases again by the accelerator pedal operation in the situation in which fuel cut is implemented, and the throttle is gradually closed.

The accelerator pedal operation is performed, and the required torque starts to increase again, whereby the cancellation conditions of fuel cut are satisfied. When the fuel cut is cancelled and the internal combustion engine returns to the combusting state again, the functions of the control device shown in the functional block diagram of FIG. 1 work, and the operation of the internal combustion engine is controlled in accordance with the functions. The operation of the internal combustion engine shown in each of the graphs of FIGS. 4 and 5 is the operation in the transition period until the functions shown in the functional block diagram of FIG. 1 completely work.

When the cancellation conditions of fuel cut are satisfied, the control device sequentially restarts fuel injection for each cylinder in accordance with the ignition sequence of the cylinders. On this occasion, the control device predicts the throttle opening at the time point of valve closing of the intake valve of the cylinder to be the target of fuel injection, as described in the functional block diagram of FIG. 1. The determined value of KL is calculated from the predicted throttle opening, and the fuel injection amount of the cylinder is calculated from the determined value of KL and the target air-fuel ratio.

Further, when the cancellation conditions of fuel cut are satisfied, the control device immediately switches the control method of the throttle to control corresponding to the combusting state from the control corresponding to the non-combusting state. In concrete, as shown in the functional block diagram of FIG. 1, the target KL is calculated from the required torque, the target KL is converted into the throttle opening, and the throttle opening is subjected to the processing of being delayed by a predetermined delay time. Subsequently, with the throttle opening after being subjected to the delay processing used as the target opening, the throttle is controlled. However, the control of the throttle is enabled by such a routine only after the control method of the throttle is switched, that is, after the delay time elapses after the cancellation conditions of the fuel cut are satisfied. Until the delay time elapses, the state is such that the target opening for controlling the throttle is not present.

Until the delay time elapses after the cancellation conditions of fuel cut are satisfied, the control device of the present embodiment operates the throttle as follows as gap-bridging control during that while. First, the operation shown in FIG. 4 will be described. According to FIG. 4, the throttle is controlled to the closing side. In the drawing, the change of the throttle opening shown by the solid line and the change of the throttle opening shown by the alternate long and short dashed line are shown, and both of them express that the throttles are controlled to the closing side. More specifically, the throttle being controlled to the closing side described here may be (1) closing the throttle to a predetermined opening (for example, full closure) at a maximum speed, and keeping the throttle at the predetermined opening until the delay time elapses, or may be (2) gradually closing the throttle at a constant gradient until the delay time elapses. What is important here is to realize such an operation of the throttle by the time when KL is determined in the first cylinder where fuel injection is restarted. However, the operation of the throttle to the closing side can be started by this time, and does not have to be necessarily finished.

As described above, for accurate calculation of the fuel injection amount, the determined value of KL is required as information, and in order to predict the determined value of KL, the throttle opening in the time point of valve closure of the intake valve is required as information. If the throttle opening is closed to the predetermined opening as shown by the solid line in FIG. 4, and the throttle opening is closed at the constant gradient as shown by the alternate long and short dashed line, the throttle opening at the time point of valve closing of the intake valve can be accurately predicted. Based on the prediction of the accurate throttle opening, the determined value of KL to be the basis of calculation of the fuel injection amount can be accurately predicted.

Further, as known from the change of KL shown in FIG. 4, as the result that the throttle is controlled to the closing side, the air amount in the intake pipe decreases, and KL which becomes the basis of calculation of the fuel injection amount also decreases. As a result, the torque which is generated by combustion until the delay time elapses, including the initial combustion after return from the fuel cut is suppressed to be low. The number of times of combustion in which the torque is suppressed varies depending on the relationship between the length of the delay time and the engine speed, and the torque is suppressed at least in the initial time of combustion, or a plurality of times of combustion in some instances. Thereby, large torque shock is prevented from occurring with return from fuel cut. After the delay time elapses from the cancellation of the fuel cut, the throttle is controlled in accordance with the target opening subjected to delay processing. Thereby, KL can be increased to achieve the required torque from the torque directly after restart of combustion which is suppressed to be low.

Next, an operation shown in FIG. 5 will be described. According to FIG. 5, when the cancellation conditions of fuel cut are satisfied, the throttle is kept at a constant opening without being moved, until the delay time elapses. During this while, the value of KL also becomes substantially constant since the throttle is kept at a constant opening, and based on the constant value of KL, calculation of the fuel injection amount is performed. After the delay time elapses, the throttle is controlled in accordance with the target opening which is subjected to delay processing as in the operation shown in FIG. 4.

Whether to realize the operation shown in FIG. 4, or the operation shown in FIG. 5 is determined in accordance with the value of KL at the time point when the cancellation conditions of fuel cut are satisfied. When the value of KL at that time point is larger than KL1 which is the reference value, control of the internal combustion engine is performed to realize the operation shown in FIG. 4. Meanwhile, when the value of KL is not larger than KL1, control of the internal combustion engine is performed to realize the operation shown in FIG. 5. When KL is small, torque which is generated by combustion is small, and therefore, even if KL is not further reduced, the possibility of occurrence of torque shock is low. In such a case, useless movement of the throttle can be restrained by selecting the operation shown in FIG. 5.

Figure 6:
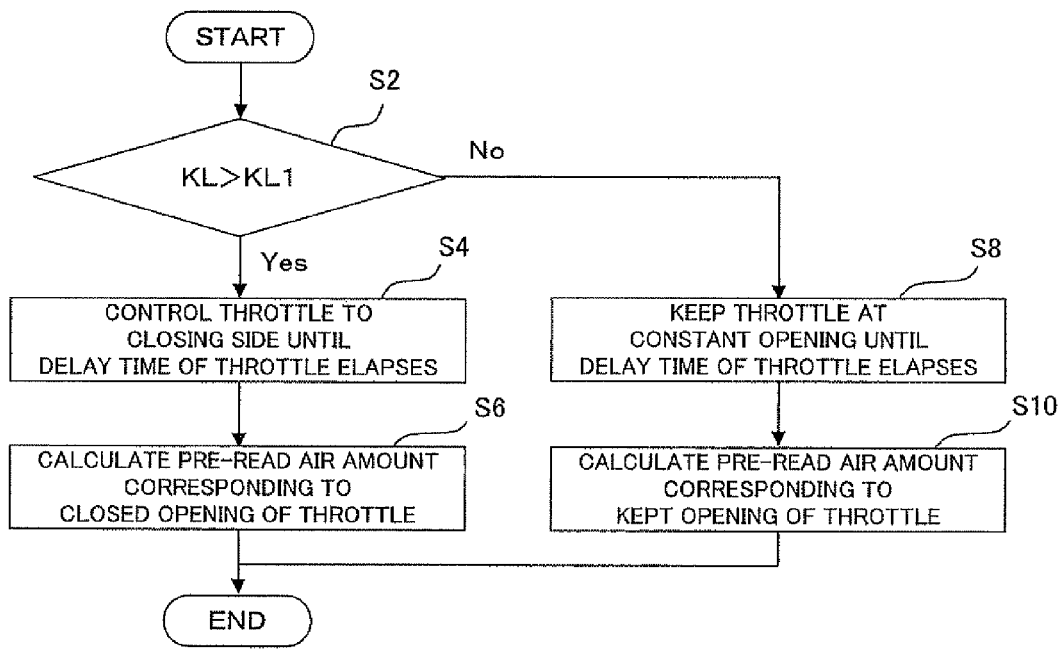
FIG. 6 shows a control flow for use in control of the internal combustion engine in the embodiment of the present invention.

FIG. 6 shows the above described determination method and the content of the operation selected in accordance with the determination result in a flowchart. In the first step S2, it is determined whether KL at the time point when the cancellation conditions of fuel cut are satisfied is larger than KL1 of the reference value. If the determination result is affirmative, the throttle is controlled to the closed side until the delay time elapses (step S4), and the pre-read air amount corresponding to the closed opening of the throttle, that is, the determined value of KL is calculated (step S6). Meanwhile, if the determination result is negative, the throttle is kept at a constant opening until the delay time elapses (step S8), and the pre-read air amount corresponding to the kept opening of the throttle is calculated (step S10). In the present embodiment, when fuel cut is cancelled halfway in the closing operation of the throttle, control of the internal combustion engine is performed in accordance with the control flow shown in FIG. 6.

The embodiment of the present invention is described above, but the present invention is not limited to the aforementioned embodiment. The present invention can be carried out by being variously modified from the aforementioned embodiment without departing from the gist of the present invention.

The invention claimed is:

1. A control device for an internal combustion engine in which a throttle can be operated during implementation of fuel cut, comprising:

target opening setting means which sets a target opening of the throttle based on a target air amount in a cylinder determined from a required torque, when the cancellation conditions of fuel cut are satisfied;

delay processing means which delays the target opening set by the target opening setting means by a predetermined delay time;

throttle control means which controls the throttle to a closing side in accordance with a predetermined rule until the delay time elapses after the cancellation conditions of fuel cut are satisfied, and controls the throttle in accordance with the delayed target opening after the delay time elapses;

throttle opening predicting means which predicts the throttle opening at the valve closing time point of an intake valve based on the rule until the delay time elapses after the cancellation conditions of fuel cut are satisfied, and predicts the throttle opening at the valve closing time point of the intake valve based on the target opening before delay processing after the delay time elapses;

final in-cylinder air amount calculating means which calculates a final in-cylinder air amount of each cylinder based on the predicted throttle opening at the valve closing time point of the intake valve; and fuel injection control means which calculates a fuel injection amount for each cylinder with the use of the final in-cylinder air amount, and sequentially restarts fuel injection for each cylinder in accordance with an ignition sequence among cylinders, when cancellation conditions of fuel cut are satisfied.

2. The control device for an internal combustion engine according to claim 1, wherein the throttle control means controls an opening of the throttle to generate pump loss corresponding to a required torque during implementation of fuel cut.

3. The control device for an internal combustion engine according to claim 1, wherein the throttle control means controls the throttle to a closing side when the air amount in a cylinder predicted at a time point when the cancellation conditions of fuel cut are satisfied exceeds a predetermined reference amount, and keeps the throttle at a constant opening until the delay time elapses when the predicted air amount in a cylinder is not larger than the predetermined reference amount.

4. The control device for an internal combustion engine according to claim 1, further comprising:

ignition time control means which, when a required torque is lower than the torque which is achieved by the throttle being controlled in accordance with a target opening, controls an ignition time in accordance with a deviation of those torques in order to compensate the deviation by torque regulation by an ignition time, wherein the throttle control means closes the throttle in accordance with a target air amount in a cylinder determined from the required torque until the implementation conditions of fuel cut are satisfied during deceleration of a vehicle, opens the throttle temporarily to a maximum opening when the implementation conditions of the fuel cut are satisfied, and thereafter, closes the throttle again to increase pump loss in accordance with decrease of the required torque.

5. The control device for an internal combustion engine according to claim 4, wherein the throttle control means keeps the throttle at a constant opening without opening the throttle or closes the throttle to full closure when the implementation conditions of fuel cut are satisfied when operation of a brake actuator is sensed during deceleration of the vehicle.

6. A control device for an internal combustion engine in which a throttle can be operated during implementation of fuel cut, comprising:

a unit which sets a target opening of the throttle based on a target air amount in a cylinder determined from a required torque, when the cancellation conditions of fuel cut are satisfied;

a unit which delays the target opening by a predetermined delay time;

a unit which controls the throttle to a closing side in accordance with a predetermined rule until the delay time elapses after the cancellation conditions of fuel cut are satisfied, and controls the throttle in accordance with the delayed target opening after the delay time elapses;

a unit which predicts the throttle opening at the valve closing time point of an intake valve based on the rule until the delay time elapses after the cancellation conditions of fuel cut are satisfied, and predicts the throttle opening at the valve closing time point of the intake valve based on the target opening before delay processing after the delay time elapses;

a unit which calculates a final in-cylinder air amount of each cylinder based on the predicted throttle opening at the valve closing time point of the intake valve; and a unit which calculates a fuel injection amount for each cylinder with the use of the final in-cylinder air amount, and sequentially restarts fuel injection for each cylinder in accordance with an ignition sequence among cylinders, when cancellation conditions of fuel cut are satisfied.

* * * * *